Patented Dec. 13, 1932

1,890,697

UNITED STATES PATENT OFFICE

ROBERT W. SCANLAN, OF ST. LOUIS, MISSOURI, ASSIGNOR TO RALSTON PURINA COMPANY, OF ST. LOUIS, MISSOURI, A CORPORATION OF MISSOURI

PROCESS OF MANUFACTURING PUFFED CEREAL FOOD

Application filed December 8, 1928. Serial No. 324,731.

My invention relates to puffed cereal food made from a mixture of cereal flour rather than from whole cereal grain, and to the process by which such puffed cereal food is manufactured.

Figure 1:
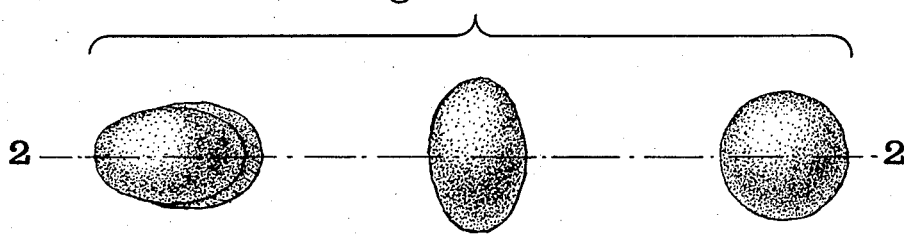
Figure 2:
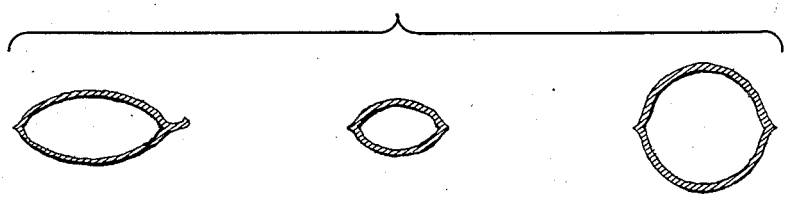

In the accompanying drawing which illustrates some typical forms of food units made according to my invention, Figure 1 shows the units in elevation, and Figure 2 is a sectional view taken on the line 2—2 of Figure 1.

In carrying out my process a plurality of cereal flours are mixed and water added to form a fairly dry dough which is mixed in the usual manner. I prefer to use wheat flour for the principal ingredient of the dough and I use therewith another kind of flour containing a different variety of starch and one which, in the carrying out of my process, causes the flakes of the mixture to puff into a form having a hollow center and relatively thin walls. Of the various flours containing "puffing" starch I have found rice flour to be the most desirable. The mixture which I prefer to use consists of 65% of wheat flour, of which 15% may be whole wheat flour, and 35% of rice flour.

The dough, formed as above described, (and to which may be added if desired, various other food ingredients such as proteins, salt, and flavors) is pressed through a macaroni or other die machine and the resulting strands severed into uniform pellets which are cooked and then dried to reduce the moisture content to about 18 to 22 per cent. To form the puffed cereal food, which is the object of my invention, pellets formed as described or by equivalent means are then subjected to the action of dry steam to heat them to about 180 degrees F. The use of dry steam permits the heating to be accomplished without the formation of crust on their surface and without rendering the surface moist and sticky.

Immediately after the steam treatment and while the pellets are still hot they are rolled into thin flakes. The thickness of these flakes may vary somewhat but I have found that the limits which will produce satisfactory results are a maximum of about 1/16 of an inch and a minimum of about 1/64 of an inch.

These flakes are now placed in an oven and baked at a moderate temperature for from one and a half to five minutes with the result that they "puff" or expand. After the puffing has taken place the baking is continued at a raised temperature (approximately 500 degrees F.) until the flakes are thoroughly toasted.

My process produces hollow cereal food units having approximately globular or ellipsoidal form with very thin walls and also having a pleasing and appetizing appearance.

I wish it to be understood that throughout the specification and claims the term "cereal" is intended to include potato flour and other flours such as are commonly substituted wholly or in part for grain flours in the baking art.

It is also to be understood that my invention is not limited to any particular method of preparing the pellets which are to be rolled into flakes preparatory to the puffing operation. In its broadest aspect my invention comprises producing a unit of such a mixture of food ingredients in such physical condition as will, when exposed to heat, expand as a whole into a food product of the kind illustrated and described.

I also desire to state that while I believe that the puffing action described is due in part at least to the physical and chemical reaction of certain kinds of starch when exposed to heat, it may rather be due in whole or in part to other causes such as the physical character of the surface of the flake while being subjected to the puffing operation and the moisture content at that time.

Having fully described my invention, what I claim as new and desire to secure by Letters Patent of the United States is:

1. The process of manufacturing food units of hollow globular form, which comprises forming a dough of a plurality of cereal flours embodying a puffing starch, dividing the uncooked dough into pellets, cookings the pellets, heating the pellets by dry steam, rolling the pellets while hot to form them into thin flakes, baking the flakes at a moderate temperature to puff or expand them into globular form, and then subjecting the resultant puffed unit to a higher temperature to toast them.

2. The process of manufacturing food units of hollow globular form, which comprises forming a dough of a plurality of cereal flours embodying a puffing starch, dividing the uncooked dough into pellets, cooking the pellets, drying the cooked pellets, heating the dried pellets by dry steam, rolling the pellets while hot to form them into thin flakes, and baking the flakes to puff or expand them into globular form.

3. The process of manufacturing food units of hollow globular form, which comprises forming a dough of a plurality of cereal flours embodying a puffing starch, dividing the uncooked dough into pellets, cooking the pellets, drying the cooked pellets, heating the dried pellets by dry steam, rolling the pellets while hot to form them into thin flakes, baking the flakes to puff or expand them into globular form, and then subjecting the resultant puffed units to a higher temperature to toast them.

In testimony whereof, I hereunto affix my signature, this 30th day of November, 1928.

ROBERT W. SCANLAN.